(12) United States Patent
Li et al.

(10) Patent No.: US 11,422,360 B2
(45) Date of Patent: Aug. 23, 2022

(54) WAVELENGTH CONVERSION ELEMENT WITH GOOD EFFECT OF HEAT DISSIPATION

(71) Applicant: DELTA ELECTRONICS, INC., Taoyuan (TW)

(72) Inventors: Jih-Chi Li, Taoyuan (TW); Wen-Cheng Huang, Taoyuan (TW); Li-Cheng Yang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/005,335

(22) Filed: Aug. 28, 2020

(65) Prior Publication Data
US 2021/0318600 A1  Oct. 14, 2021

(30) Foreign Application Priority Data
Apr. 8, 2020 (CN) .......................... 202010268114.X

(51) Int. Cl.
*G02B 26/00* (2006.01)
*G03B 21/20* (2006.01)
*F21V 8/00* (2006.01)

(52) U.S. Cl.
CPC ......... *G02B 26/008* (2013.01); *G03B 21/204* (2013.01); *G02B 6/0026* (2013.01)

(58) Field of Classification Search
CPC ... G03B 21/204; G03B 6/0026; G02B 26/008
See application file for complete search history.

(56) References Cited

U.S. PATENT DOCUMENTS

| | | | | |
|---|---|---|---|---|
| 6,999,251 B2* | 2/2006 | Kao | ....................... | G03B 21/14 348/743 |
| 7,190,536 B2* | 3/2007 | Jiang | .................... | G02B 26/008 348/743 |
| 7,333,278 B2* | 2/2008 | Takao | .................... | G02B 5/285 359/891 |
| 7,942,535 B2* | 5/2011 | Kjaer | ..................... | G03B 21/14 353/84 |

(Continued)

FOREIGN PATENT DOCUMENTS

| | | |
|---|---|---|
| CN | 105511213 A | 4/2016 |
| CN | 109838703 A | 6/2019 |

(Continued)

*Primary Examiner* — Magda Cruz
(74) *Attorney, Agent, or Firm* — CKC & Partners Co., LLC

(57) ABSTRACT

A wavelength conversion element includes a base plate and a rotating device. The base plate has a first surface and a second surface. The first surface is configured to allow a fluorescent layer to dispose on. The base plate includes some first grooves and some second grooves. The first grooves are disposed on the first surface around a center of the base plate. The second grooves are disposed on the second surface around the center. The first grooves and the second grooves are staggered from each other along a rotating direction. The base plate has some through holes. Each of the through holes communicates with the second surface and the corresponding first groove. The rotating device is connected with the base plate and configured to drive the base plate to rotate about an axis along the rotating direction. The axis passes through the center.

5 Claims, 5 Drawing Sheets

(56) References Cited

U.S. PATENT DOCUMENTS

| | | | |
|---|---|---|---|
| 8,767,102 B2* | 7/2014 | Fish | H04N 5/2254 |
| | | | 348/270 |
| 9,470,886 B2 | 10/2016 | Bartlett | |
| 10,527,840 B2* | 1/2020 | Yoshikawa | G02B 5/20 |
| 2013/0169938 A1* | 7/2013 | Huang | G03B 33/08 |
| | | | 353/31 |
| 2016/0077325 A1* | 3/2016 | Tsai | G02B 26/008 |
| | | | 353/31 |
| 2016/0077326 A1* | 3/2016 | Yamagishi | G02B 7/008 |
| | | | 353/61 |
| 2016/0170199 A1* | 6/2016 | Inoue | G03B 21/14 |
| | | | 348/761 |
| 2016/0291315 A1* | 10/2016 | Hsu | G02B 26/008 |
| 2016/0363294 A1* | 12/2016 | Yu | B60Q 1/02 |
| 2018/0373023 A1* | 12/2018 | Fujii | G02B 5/0278 |
| 2019/0137858 A1* | 5/2019 | Hsieh | G03B 21/2066 |
| 2019/0146316 A1* | 5/2019 | Tsai | G03B 21/204 |
| | | | 353/57 |
| 2020/0064619 A1* | 2/2020 | Hsu | G03B 21/16 |
| 2020/0278599 A1* | 9/2020 | Takasawa | F21V 7/30 |

FOREIGN PATENT DOCUMENTS

| | | |
|---|---|---|
| TW | I507805 B | 11/2015 |
| TW | I530751 B | 4/2016 |
| TW | I639852 B | 11/2018 |
| TW | 201918782 A | 5/2019 |

\* cited by examiner

WAVELENGTH CONVERSION ELEMENT WITH GOOD EFFECT OF HEAT DISSIPATION

RELATED APPLICATIONS

This application claims priority to Chinese Application Serial Number 202010268114.X filed Apr. 8, 2020, which is herein incorporated by reference.

BACKGROUND

Technical Field

The present disclosure relates to wavelength conversion elements. More particularly, the present disclosure relates to wavelength conversion elements used in laser projectors.

Description of Related Art

With the advancement of the technology today, the demand on high quality of projecting display has been increasing. Since laser projectors can provide better picture quality than traditional projectors, the applications of laser projectors have become more popular. The applications range from professional fields to daily lives.

During the operation of laser projectors, since laser of high energy is applied, how to allow the laser projectors to achieve a good effect of heat dissipation is an urgent issue that is important to the industry.

SUMMARY

A technical aspect of the present disclosure is to provide a wavelength conversion element, which can effectively achieve a good effect of heat dissipation, thus enhancing the operational performance.

According to an embodiment of the present disclosure, a wavelength conversion element includes a base plate and a rotating device. The base plate has a first surface and a second surface. The first surface and the second surface are opposite to each other. The first surface is configured to allow a fluorescent layer to dispose on. The base plate further includes a plurality of first grooves and a plurality of second grooves. The first grooves are disposed on the first surface around a center of the base plate. The second grooves are disposed on the second surface around the center. The first grooves and the second grooves are staggered from each other along a rotating direction. The base plate further has a plurality of through holes. Each of the through holes communicates with the second surface and the corresponding first groove. The rotating device is connected with the base plate and configured to drive the base plate to rotate about an axis along the rotating direction. The axis passes through the center.

In one or more embodiments of the present disclosure, the base plate further includes a first subsidiary base plate and a second subsidiary base plate. The first subsidiary base plate has a plurality of hollow portions. The hollow portions define the first grooves. The first surface is located on the first subsidiary base plate. The second subsidiary base plate is stuck on the first subsidiary base plate. The second subsidiary base plate has an annular portion and a plurality of blocking plates. The blocking plates separate from each other and define the second grooves therebetween. The blocking plates connect to the annular portion around the center and cover the hollow portions of the first subsidiary base plate. The second surface is located on the second subsidiary base plate. Each of the through holes penetrates through the corresponding blocking plate.

In one or more embodiments of the present disclosure, a shape of each of the hollow portions matches with a shape of the corresponding blocking plate.

In one or more embodiments of the present disclosure, each of the blocking plates has a first edge and a second edge opposite to each other and respectively adjacent to the corresponding second groove. The first edge and the second edge respectively shape as a curve towards a direction.

In one or more embodiments of the present disclosure, the first subsidiary base plate includes an inner ring, an outer ring and a plurality of connecting portions. The inner ring is configured to connect with the rotating device. The outer ring defines a working region to allow the fluorescent layer to dispose on. The connecting portions separate from each other and connect between the inner ring and the outer ring to define the hollow portions therebetween.

In one or more embodiments of the present disclosure, the rotating device is a motor.

When compared with the prior art, the above-mentioned embodiments of the present disclosure have at least the following advantages:

(1) Since the base plate is formed from sticking a piece of the first subsidiary base plate and a piece of the second subsidiary base plate together rather than stamping of a single structural piece, the problems of mechanical deformation and excessive internal stress to the base plate are eliminated.

(2) When the wavelength conversion element operates, the rotating device drives the base plate to rotate about the axis along the rotating direction. Therefore, the connecting portion adjacent to the first groove pushes the air located in the first groove to move along the rotating direction, and a turbulence is produced. This turbulence facilitates to reduce the temperature increased due to the irradiation of the laser on the fluorescent layer. In this way, the operational performance of the wavelength conversion element is effectively increased.

(3) When the rotating device drives the base plate to rotate about the axis along the rotating direction, the blocking plate adjacent to the second groove pushes the air located in the second groove to move along the rotating direction, and a turbulence is produced. This turbulence facilitates to take away the unwanted heat produced by the second subsidiary base plate during the operation of the wavelength conversion element. In this way, the operational performance of the wavelength conversion element is effectively increased.

(4) When the wavelength conversion element operates, i.e., when the rotating device drives the base plate to rotate about the axis along the rotating direction, the air located at the side of the second surface will flow to the side of the first surface through the through holes. In this way, this flow of air from the second surface to the first surface will lead to the effect of heat isolation, and the chance that the unwanted heat produced when the fluorescent layer is irradiated by the laser transmits to the rotating device is reduced. Thus, the operational performance of the rotating device is enhanced and its working life is increased.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
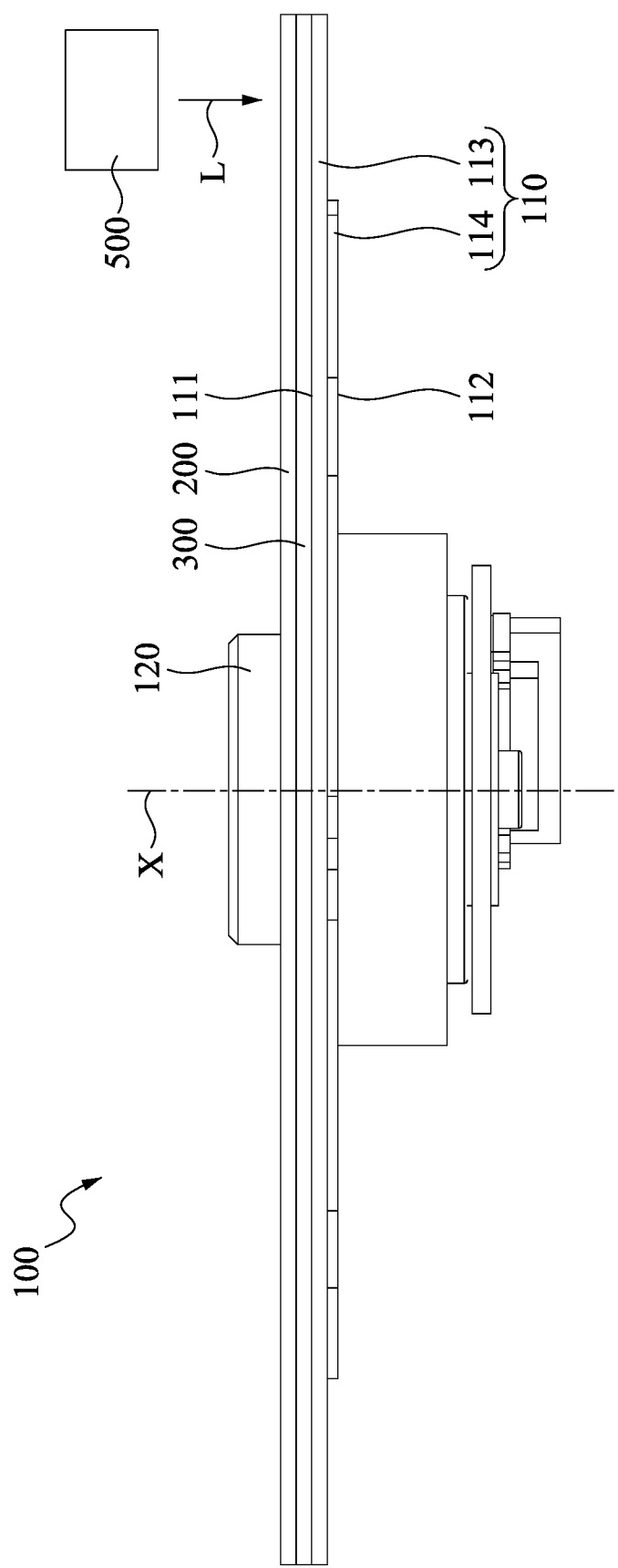
FIG. 1 is a schematic view of a wavelength conversion element according to an embodiment of the present disclosure.

Drawings will be used below to disclose embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meanings as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference is made to FIG. 1. FIG. 1 is a schematic view of a wavelength conversion element 100 according to an embodiment of the present disclosure. In this embodiment, as shown in FIG. 1, a wavelength conversion element 100 includes a base plate 110 and a rotating device 120. The base plate 110 has a first surface 111 and a second surface 112. The first surface 111 and the second surface 112 are opposite to each other. The first surface 111 of the base plate 110 is configured to allow a fluorescent layer 200 to dispose on. The rotating device 120 is connected with the base plate 110 and configured to drive the base plate 110 to rotate about an axis X along a rotating direction D (please refer to FIGS. 2 & 5). The axis X passes through a center C of the base plate 110. For example, the rotating device 120 can be a motor. However, this does not intend to limit the present disclosure. In practical applications, the wavelength conversion element 100 can be applied inside a laser projector (not shown), and the laser projector can include a laser source 500. When the laser projector operates, the laser source 500 emits a laser L to the fluorescent layer 200 disposed on the first surface 111 of the base plate 110, such that the fluorescent layer 200 can generate particular light rays.

Figure 2:
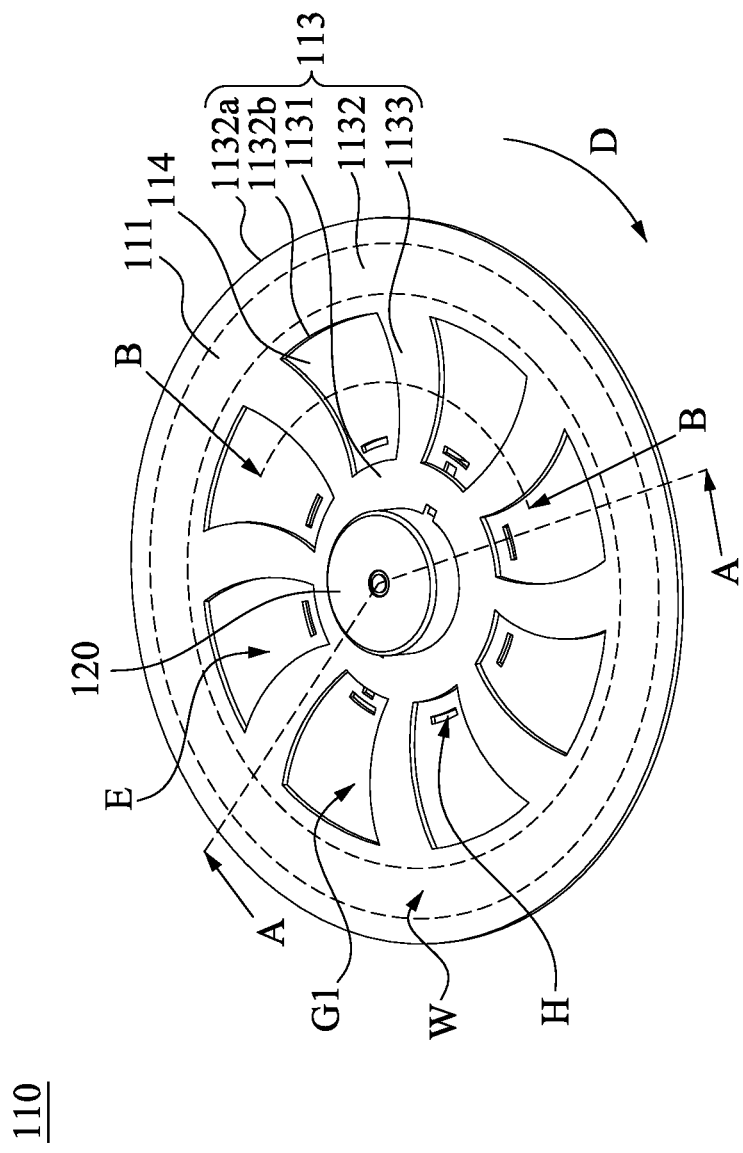
FIG. 2 is a schematic view of the base plate and the rotating device of FIG. 1.
Figure 3:
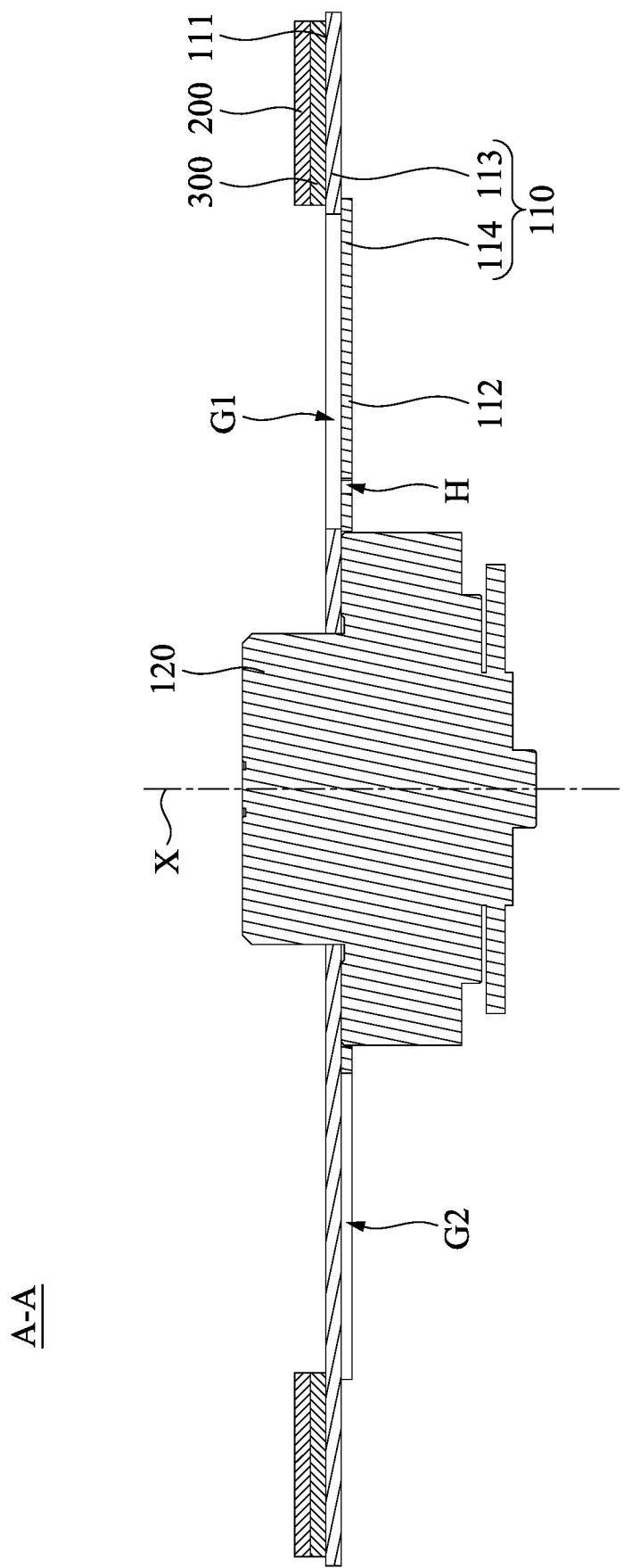
FIG. 3 is a cross-sectional view along the section line A-A of FIG. 2.

Reference is made to FIGS. 2-3. FIG. 2 is a schematic view of the base plate 110 and the rotating device 120 of FIG. 1. FIG. 3 is a cross-sectional view along the section line A-A of FIG. 2. In this embodiment, as shown in FIGS. 2-3, the base plate 110 further includes a plurality of first grooves G1 and a plurality of second grooves G2. The first grooves G1 are disposed on the first surface 111 around the center C of the base plate 110. Although the fluorescent layer 200 is not shown in FIG. 2, for the sake of understanding, the fluorescent layer 200 is shown in FIG. 3.

Figure 4:
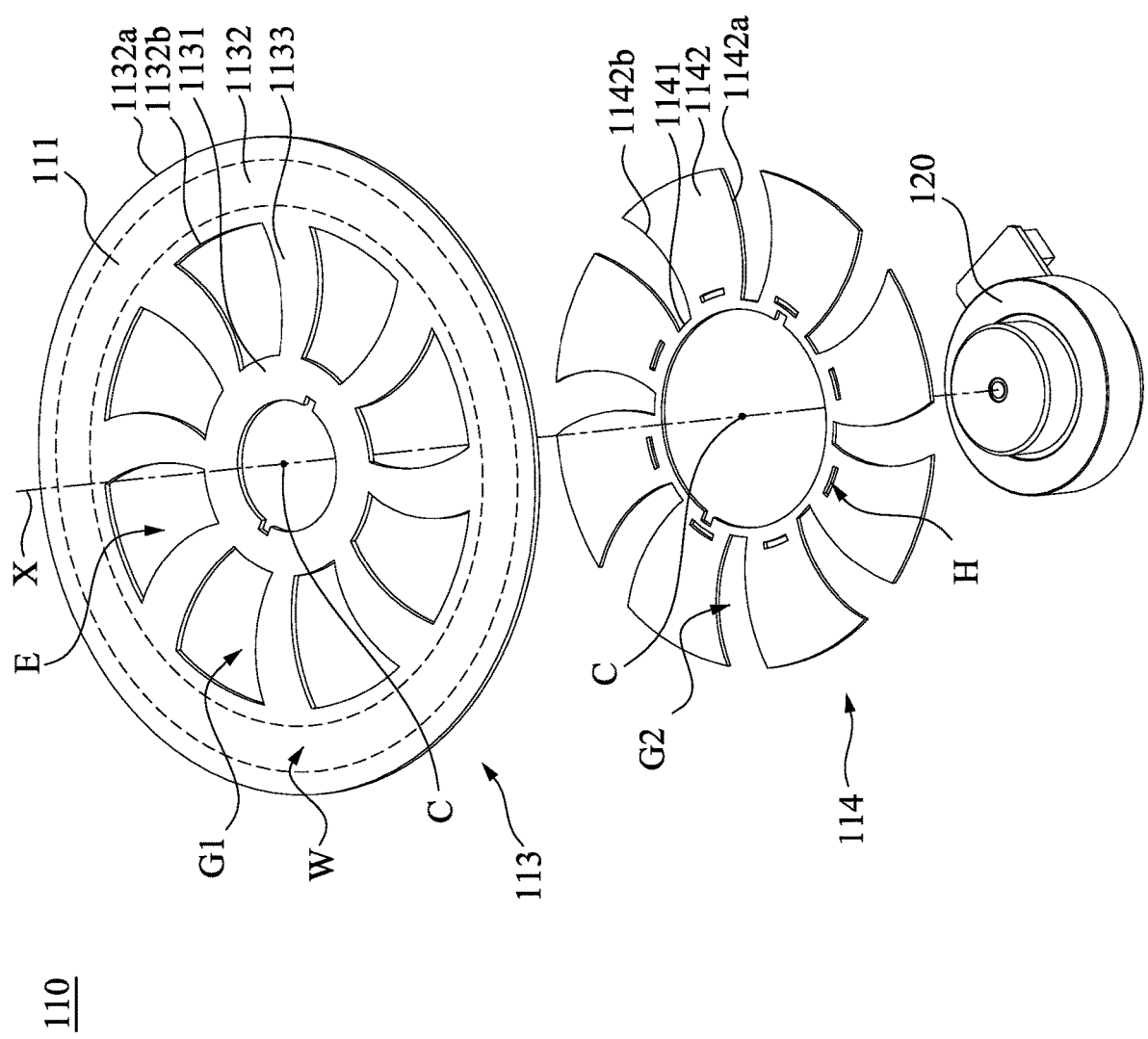
FIG. 4 is an exploded view of the base plate and the rotating device of FIG. 2.

Reference is made to FIG. 4. FIG. 4 is an exploded view of the base plate 110 and the rotating device 120 of FIG. 2. In this embodiment, as shown in FIGS. 2-4, the second grooves G2 are disposed on the second surface 112 (please refer to FIGS. 1 & 3) around the center C. The base plate 110 further has a plurality of through holes H. Each of the through holes H communicates with the second surface 112 and the corresponding first groove G1.

In addition, as shown in FIGS. 1-4, the base plate 110 further includes a first subsidiary base plate 113 and a second subsidiary base plate 114. The second subsidiary base plate 114 is stuck on the first subsidiary base plate 113. The first surface 111 is located on the first subsidiary base plate 113, and the second surface 112 is located on the second subsidiary base plate 114. It is worth noting that the base plate 110 is formed from sticking a piece of the first subsidiary base plate 113 and a piece of the second subsidiary base plate 114 together, which means the base plate 110 is not formed from stamping of a single structural piece. Therefore, the problems of mechanical deformation and excessive internal stress to the base plate 110 are eliminated.

To be specific, as shown in FIGS. 2 & 4, the first subsidiary base plate 113 has a plurality of hollow portions E. The hollow portions E define the first grooves G1. As shown in FIG. 4, the second subsidiary base plate 114 has an annular portion 1141 and a plurality of blocking plates 1142. The blocking plates 1142 connect to the annular portion 1141 around the center C. A shape of each of the hollow portions E matches with a shape of the corresponding blocking plate 1142. The blocking plates 1142 are separated from each other. The blocking plates 1142 cover the hollow portions E to define the first grooves G1. Moreover, the blocking plates 1142 define the second grooves G2 therebetween. Each of the through holes H penetrates through the corresponding blocking plate 1142.

Moreover, as shown in FIG. 4, each of the blocking plates 1142 has a first edge 1142a and a second edge 1142b opposite to each other. The first edge 1142a and the second edge 1142b are respectively adjacent to the corresponding second groove G2. The first edge 1142a and the second edge 1142b of the blocking plate 1142 respectively shape as a curve towards the same direction, such that the resistance to the base plate 110 during rotation is reduced.

In addition, as shown in FIGS. 2 & 4, the first subsidiary base plate 113 includes an inner ring 1131, an outer ring 1132 and a plurality of connecting portions 1133. The inner ring 1131 is configured to connect with the rotating device 120. The connecting portions 1133 are separated from each other and connected between the inner ring 1131 and the outer ring 1132. The connecting portions 1133 define the hollow portions E therebetween. The outer ring 1132 defines a working region W. The working region W is annular in shape and between an outer edge 1132a of the outer ring 1132 and an inner edge 1132b of the outer ring 1132. The working region W is configured to allow the fluorescent layer 200 to dispose on. To be specific, the laser source 500 can at least partially irradiate on the working region W through one or more optical element(s) (not shown). In practical applications, a reflective layer 300 is disposed between the outer ring 1132 and the fluorescent layer 200, so as to enhance the effect of irradiation of the laser L on the fluorescent layer 200. When the laser projector operates, the laser source 500 emits the laser L. The laser L is irradiated on the working region W through the optical element(s) as mentioned above, such that the fluorescent layer 200 disposed on the working region W can generate particular light rays.

Figure 5:
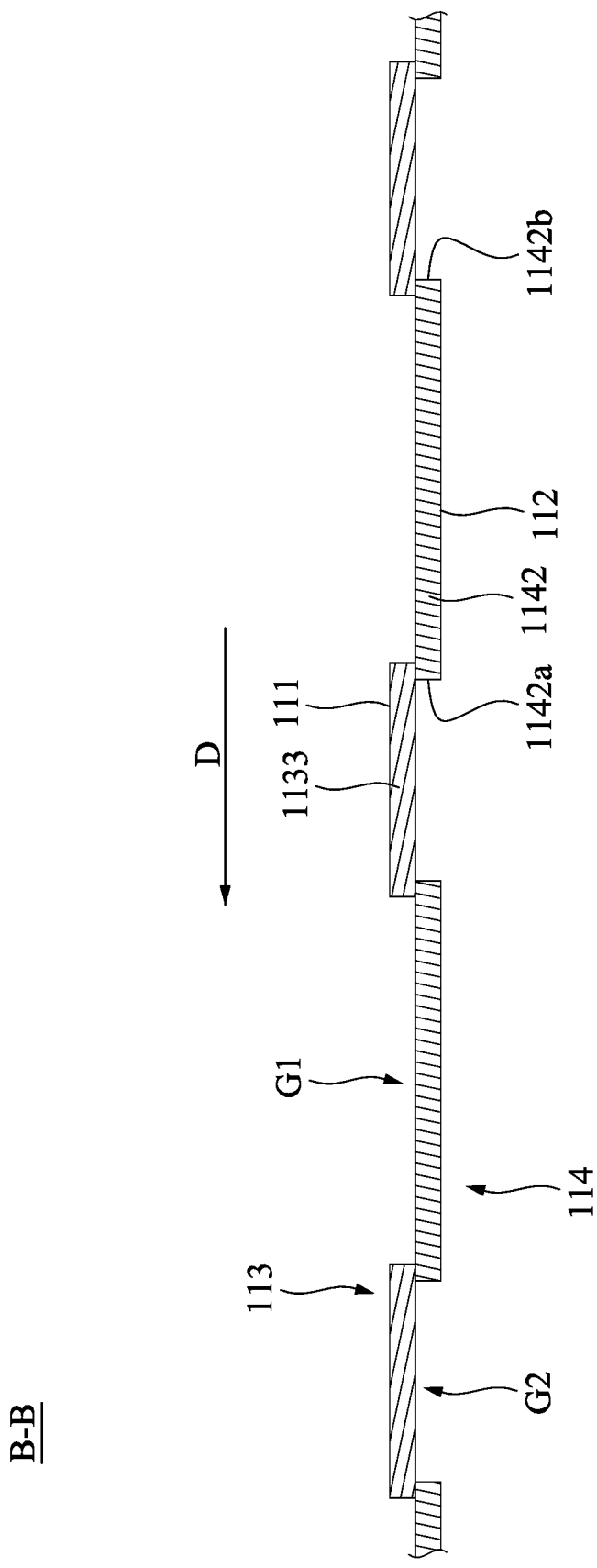
FIG. 5 is a cross-sectional view along the section line B-B of FIG. 2.

Reference is made to FIG. 5. FIG. 5 is a cross-sectional view along the section line B-B of FIG. 2. In this embodiment, as shown in FIG. 5, the first grooves G1 and the second grooves G2 are staggered from each other along the rotating direction D. To be specific, when the wavelength conversion element 100 operates, the rotating device 120 drives the base plate 110 to rotate about the axis X along the rotating direction D. Therefore, the connecting portion 1133 adjacent to the first groove G1 pushes the air located in the first groove G1 to move along the rotating direction D, and a turbulence is produced. This turbulence facilitates to reduce the temperature increased due to the irradiation of the laser L on the fluorescent layer 200. In this way, the operational performance of the wavelength conversion element 100 is effectively increased.

Similarly, when the rotating device 120 drives the base plate 110 to rotate about the axis X along the rotating direction D, the blocking plate 1142 adjacent to the second groove G2 pushes the air located in the second groove G2 to move along the rotating direction D, and a turbulence is produced. This turbulence facilitates to take away the unwanted heat produced by the second subsidiary base plate 114 during the operation of the wavelength conversion element 100. In this way, the operational performance of the wavelength conversion element 100 is effectively increased.

Moreover, as mentioned above, each of the through holes H penetrates through the corresponding blocking plate 1142, and communicates with the second surface 112 and the corresponding first groove G1, as shown in FIG. 3. Therefore, when the wavelength conversion element 100 operates, i.e., when the rotating device 120 drives the base plate 110 to rotate about the axis X along the rotating direction D, the air located at the side of the second surface 112 will flow to the side of the first surface 111 through the through holes H, just like flowing from the below of the base plate 110 to the above of the base plate 110 as shown in FIG. 3. In this way, this upward flow of air from the below will lead to the effect of heat isolation, and the chance that the unwanted heat produced when the fluorescent layer 200 is irradiated by the laser L transmits to the rotating device 120 is reduced. Thus, the operational performance of the rotating device 120 is enhanced and its working life is increased.

In conclusion, when compared with the prior art, the aforementioned embodiments of the present disclosure have at least the following advantages:

(1) Since the base plate is formed from sticking a piece of the first subsidiary base plate and a piece of the second subsidiary base plate together rather than stamping of a single structural piece, the problems of mechanical deformation and excessive internal stress to the base plate are eliminated.

(2) When the wavelength conversion element operates, the rotating device drives the base plate to rotate about the axis along the rotating direction. Therefore, the connecting portion adjacent to the first groove pushes the air located in the first groove to move along the rotating direction, and a turbulence is produced. This turbulence facilitates to reduce the temperature increased due to the irradiation of the laser on the fluorescent layer. In this way, the operational performance of the wavelength conversion element is effectively increased.

(3) When the rotating device drives the base plate to rotate about the axis along the rotating direction, the blocking plate adjacent to the second groove pushes the air located in the second groove to move along the rotating direction, and a turbulence is produced. This turbulence facilitates to take away the unwanted heat produced by the second subsidiary base plate during the operation of the wavelength conversion element. In this way, the operational performance of the wavelength conversion element is effectively increased.

(4) When the wavelength conversion element operates, i.e., when the rotating device drives the base plate to rotate about the axis along the rotating direction, the air located at the side of the second surface will flow to the side of the first surface through the through holes. In this way, this flow of air from the second surface to the first surface will lead to the effect of heat isolation, and the chance that the unwanted heat produced when the fluorescent layer is irradiated by the laser transmits to the rotating device is reduced. Thus, the operational performance of the rotating device is enhanced and its working life is increased.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A wavelength conversion element, comprising:
   a base plate having a first surface and a second surface opposite to each other, the first surface being configured to allow a fluorescent layer to dispose on, the base plate further comprising a plurality of first grooves and a plurality of second grooves, the first grooves being disposed on the first surface around a center of the base plate, the second grooves being disposed on the second surface around the center, the first grooves and the second grooves being staggered from each other along a rotating direction, the base plate further having a plurality of through holes, each of the through holes communicating with the second surface and the corresponding first groove, wherein the base plate further comprises:
     a first subsidiary base plate having a plurality of hollow portions defining the first grooves, the first surface is located on the first subsidiary base plate; and
     a second subsidiary base plate stuck on the first subsidiary base plate, the second subsidiary base plate has an annular portion and a plurality of blocking plates, the blocking plates are separated from each other and define the second grooves therebetween, the blocking plates are connected to the annular portion around the center and cover the hollow portions of the first subsidiary base plate, the second surface is located on the second subsidiary base plate, and each of the through holes penetrates through the corresponding blocking plate; and
   a rotating device connected with the base plate and configured to drive the base plate to rotate about an axis along the rotating direction, the axis passing through the center.

2. The wavelength conversion element of claim 1, wherein a shape of each of the hollow portions matches with a shape of the corresponding blocking plate.

3. The wavelength conversion element of claim 1, wherein each of the blocking plates has a first edge and a second edge opposite to each other and respectively adjacent to the corresponding second grooves, and the first edge and the second edge respectively shape as a curve towards a direction.

4. The wavelength conversion element of claim 1, wherein the first subsidiary base plate comprises:
   an inner ring configured to connect with the rotating device;
   an outer ring defining a working region to allow the fluorescent layer to dispose on; and
   a plurality of connecting portions separated from each other and connecting the inner ring and the outer ring to define the hollow portions therebetween.

5. The wavelength conversion element of claim 1, wherein the rotating device is a motor.

\* \* \* \* \*